United States Patent [19]
Richards

[11] Patent Number: 4,907,082
[45] Date of Patent: Mar. 6, 1990

[54] DYNAMIC CONTROL MENU FOR A TELEVISION SYSTEM OR THE LIKE

[75] Inventor: Roger L. Richards, Indianapolis, Ind.

[73] Assignee: Thomson Consumer Electronics, Inc., Indianapolis, Ind.

[21] Appl. No.: 183,507

[22] Filed: May 3, 1988

[51] Int. Cl.[4] .............................................. H04N 7/04
[52] U.S. Cl. .................................... 358/143; 358/188; 358/194.1
[58] Field of Search ............... 358/141, 142, 143, 144, 358/183, 181, 188, 198, 194.1; 381/2, 12

[56] References Cited

U.S. PATENT DOCUMENTS

| | | | |
|---|---|---|---|
| 4,626,892 | 12/1986 | Nortrup et al. | 358/21 |
| 4,716,589 | 12/1987 | Matsui | 358/144 |

FOREIGN PATENT DOCUMENTS

| | | | |
|---|---|---|---|
| 0129286 | 12/1984 | European Pat. Off. | |
| 0183625 | 6/1986 | European Pat. Off. | 358/142 |
| 0188184 | 11/1982 | Japan | 358/188 |

OTHER PUBLICATIONS

RCA publication "Dimensia ®", Owner's Manual, having a copyright date of 1987, pp. 1-38 and 60-81.
RCA publication "RCA Color Television Basic Service Data", 1987, CTC 140, having a 1987 copyright date, pp. 1-17 thru 1-22 and pp. 2-2, 2-4, 2-6, 2-8 and 2-15.
GE publication "CTC-140 Color TV Chassis Technical Training Manual", having a 1987 copyright date, pp. 21-33.

Primary Examiner—James J. Groody
Assistant Examiner—David E. Harvey
Attorney, Agent, or Firm—Joseph S. Tripoli; Peter M. Emanuel

[57] ABSTRACT

A television receiver includes a character generator for generating a character signal suitable for displaying a menu of various processing control choices, such as processing for monaural, stereophonic or second audio program reproduction, "on-the-screen" of a picture tube, and a control unit for dynamically altering the contents of the menu in response to the signal conditions of a received television signal, such as the presence or absence of stereophonic or second audio program information. As a result, confusion to a user in selecting a processing mode which is rendered ineffectual due to a particular signal condition is minimized.

10 Claims, 5 Drawing Sheets

DYNAMIC CONTROL MENU FOR A TELEVISION SYSTEM OR THE LIKE

The present invention is concerned with apparatus for controlling a television receiver or similar system and especially with control apparatus including provisions for displaying operating instructions.

Some television receivers and video cassette recorders have character generation provisions for displaying a "menu" of user control choices on the screen of a picture display device such as a picture tube. Such a system is described in U.S. Pat. No. 4,626,892, entitled "Television System with Menu Like Function Control Selection", issued to K. E. Nortrup, B. W. Beyers, Jr. and J. S. Fuhrer on Dec. 2, 1986.

In prior control menu systems, the displayed control choices depend on the features that the manufacturer selects for a given receiver model.

The present inventor has recognized that displaying one or more control choices in a menu may lead to confusion depending on input signal conditions, especially considering that signal conditions usually change from channel to channel. For example, in a television receiver with multiple audio processing mode choices corresponding monaural audio reproduction, stereophonic audio reproduction and reproduction of a second audio program (e.g., for a second language), displaying a menu with all three audio processing mode choices when the received television signal is not modulated with stereophonic and/or second audio program information may lead to confusion since the selection of the stereophonic or second audio program processing mode will not produce the expected response.

To avoid such confusion, in a television system constructed in accordance with the present invention, the displayed control choices in a menu, such as a audio processing mode menu, are dynamically changed in response to input signal conditions, e.g., the absence or presence of stereophonic and/or second audio program components of a received RF television signal.

The present invention will be explained with respect to the accompanying Drawing in which.

The present invention will be described with reference to a television receiver suitable for use in the U.S. where the NTSC television transmission standard as modified by the BTSC transmission standard for multichannel sound is employed. However, it is to be understood that the same principles may be applied to television receivers suitable for use in other countries where different transmission standards are employed.

Figure 1:
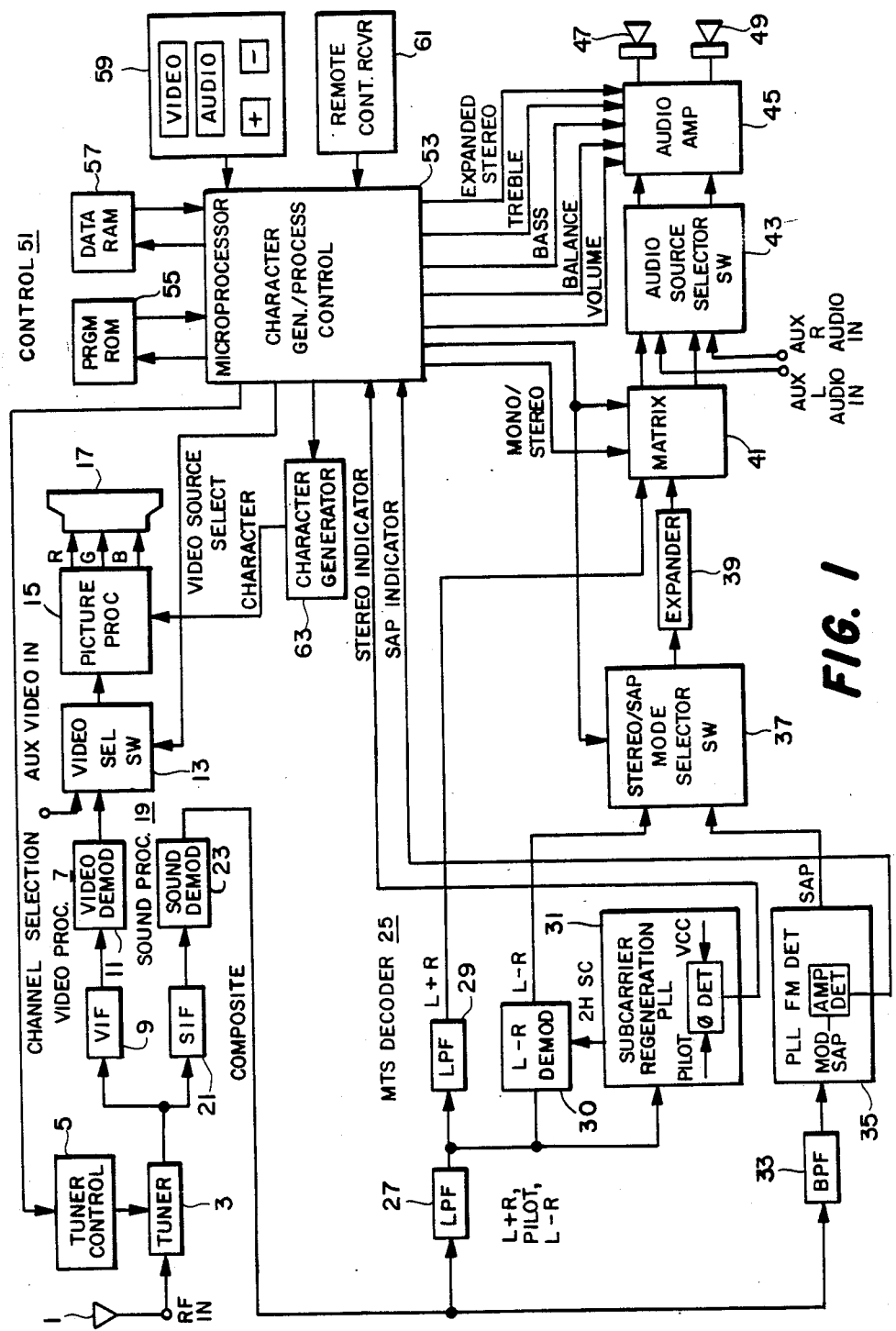
FIG. 1 shows a block diagram of a television receiver employing a preferred embodiment of the invention.

The television receiver shown in FIG. 1 includes an RF signal input for receiving RF television signals, e.g., from a broadcast receiving antenna 1, and a tuner 3 for selecting the RF television signal corresponding to a channel desired by a user and producing a corresponding IF television signal under the control of a tuning control unit 5. The IF signal includes an amplitude modulated picture carrier component centered at 45.75 MHz and a frequency modulated carrier component at 41.25 MHz.

In a video processing section 7, the IF video carrier component is filtered by a video IF filter (VIF) 9 and demodulated by a video demodulator 11 to produce a baseband video signal. Video processing section 7 also has an auxiliary baseband video signal input for receiving an "auxiliary" baseband video signal from an external source such as a video tape recorder or video disc player. A video source selector switch 13 selectively couples one of the "main" video signals derived from the RF signal selected by tuner 3 or the "auxiliary" video signal received at the auxiliary video signal input to a picture processing unit 15 under user control. Picture processing unit 15 separates the luminance and chrominance components of the video signal received from selector switch 13 to produce, e.g., red (R), green (G) and blue (B), color components suitable for producing a picture on the screen of picture tube 17. Picture processing unit 15 has control inputs (not shown) for controlling the brightness, contrast, sharpness, color level (or saturation) and tint (or hue) of the reproduced picture.

In a sound processing section 19, the IF video and sound carrier components are filtered by a sound IF (SIF) filter 21. The filtered video and sound carrier components mixed to produce an intercarrier difference frequency modulated sound carrier component (e.g., at 4.5 MHz in the U.S.) and the intercarrier sound carrier component is demodulated in a sound demodulator 23 to produce an audio signal.

Figure 1A:
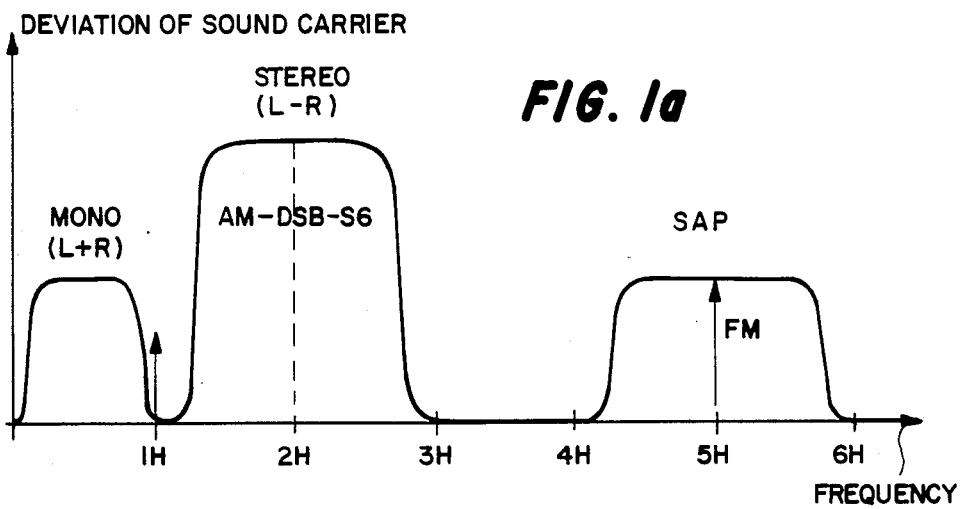
FIG. 1a shows a frequency spectrum of a composite audio signal processed by the television receiver shown in FIG. 1 and is useful in understanding its operation.

The audio signal produced by demodulator 23 contains at least a baseband component corresponding to monaural audio information and may contain one or more higher frequency components corresponding stereophonic and second audio program information, depending on what is being transmitted for the selected channel. The frequency spectrum of a "composite" audio signal containing components corresponding to monaural ("mono"), stereophonic ("stereo") and second audio program (SAP) information according to the BTSC multichannel band standard employed in the U.S. is graphically represented in FIG. 1a. The composite audio signal contains baseband component between 50 Hz and 15 KHz, an amplitude modulated double sideband suppressed carrier (AM-DSB-SC) component centered at 31.468 KHz corresponding to twice the horizontal deflection frequency (2 H), a pilot signal at 15.734 KHz corresponding to the horizontal deflection frequency (H), and a frequency modulated (FM) subcarrier component at 48.820 KHz corresponding to five times the horizontal deflection frequency. The baseband component corresponds to monaural information for monaural reproduction and corresponds to the sum of the left and right stereophonic components (L+R) for stereophonic reproduction. The AM-DSB-SC component corresponds to the difference of the left and right stereophonic components (L−R) for stereophonic reproduction. The pilot signal is utilized to demodulate the AM-DSB-SC component. The FM component corresponds to a second audio program, e.g., a second language version of the main program, and is always monaural. Both of the L−R and SAP components are subjected to dynamic amplitude and frequency responsive "compression" according to the dbx ® systems in the transmitter and, as will be explained below, to a complementary "expansion" in the receiver. Since the bandwidth of a composite audio signal is much wider than the conventional monaural audio signal different IF filter sections, described above, are employed to process the video and sound components to inhibit degradation of the reproduced audio information due to contamination from the video component.

Returning now to FIG. 1, the remainder of sound processing section 19 and the control portion of the television receiver will now be described.

The audio signal produced by sound demodulator 23 is coupled to a multichannel sound (MTS) decoder 25. During the following discussion it will be initially assumed that the stereo (L−R) and SAP components are present (i.e., they have been modulated on to the sound carrier of the RF signal for the selected television channel).

The mono (or L+R), pilot and L−R components are separated from the composite audio signal by a lowpass filter (LPF) 27. The mono/L+R component is already a baseband signal and therefore need not be demodulated. However, to separate it from the other components of the composite signal, when they are present, it is filtered by a lowpass filter (LPF) 29. To demodulate the L−R component, the 2H suppressed carrier is regenerated in phase locked loop (PLL) 31 by locking the frequency and phase of a voltage controlled oscillator (not shown) to that of the pilot signal and the resultant regenerated subcarrier is used by a synchronous detector 30 to produce a baseband L−R signal.

The SAP component is generated from composite audio signal by a bandpass filter (BPF) 33 and demodulated by a PLL type of FM detector 35 to produce a baseband SAP signal. The baseband L−R and SAP signals are coupled to a stereo/SAP selector switch 37 which is controlled, as will be explained below, to select either a stereo or a SAP audio reproduction mode by coupling the respective one of the L−R or SAP baseband signals to an expander 39. Expander 39 performs a dynamic amplitude and frequency responsive "expansion" of the selected component which is complementary to "compression" performed in the transmitter.

The mono/L+R signal produced at the output of LPF 29 and the baseband L−R or SAP signal produced at the output of expander 39 are coupled to a matrix 41, which is controlled as will also be explained below, to produce left (L) and right (R) baseband audio signals in either a monaural, stereophonic or SAP reproduction. In the monaural reproduction mode, the L and R audio signals are each derived solely from the baseband mono/L+R signal. In the stereophonic reproduction mode, the L and R audio signals are stereophonic components derived by adding and subtracting the baseband mono/L+R and L−R signals. In the SAP reproduction mode, the L and R audio signals are each derived solely from the baseband SAP signal.

Audio processing section 19 also has auxiliary left and right audio signal inputs for receiving auxiliary left and right baseband audio signals from an external source such as a video tape recorder or video disc player. The "main" and "auxiliary" L and R signals are coupled to an audio source selector switch 43, which under user control, selectively couples one pair to an audio amplifier unit 45. Audio amplifier unit 45 controls the volume, balance, bass and treble of L and R audio output signals in response to respective control signals. The L and R audio output signals are coupled to respective speakers 47 and 49.

In response to an "expanded stereo" control signal, audio amplifier unit 45 can also selectively combine a portion of the left audio signal with the right audio signal and a portion of the right audio with the left audio signal to produce an "expanded stereo" effect (when stereo informatin is present) in which there is a perceived gerater spacial separation between the left and right audio responses reaching the ear. This perception of greater stereo separation is created by cancelling the cross-coupled sound from right speaker 49 that arrives at the left ear and the cross-coupled sound from left speaker 47 that arrives at the right ear. This works like stereo headphones to isolate the left and right audio responses that arrive at the ears so that the speakers are perceived to be further apart.

Figure 2:
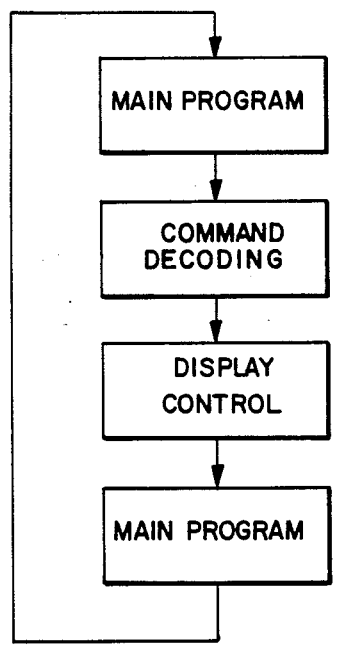
FIGS. 2 and 2a–2d show a flow chart of a portion of a program of a microprocessor employed in the television receiver shown in FIG. 1 and useful in understanding the present invention.

A control section 51 is responsible for controlling various portions of the television receiver previously described. The heart of control section 51 is a microprocessor 53. Microprocessor 53 operates in accordance with a program of instructions stored in a programmable read only memory (PROM) 55. Data processed in accordance with the program is stored in memory locations of a random access memory (RAM) 57. The portion of the program with which the present invention is concerned is shown in FIG. 2.

Microprocessor 53 receives user initiated command signals from a control panel 59 mounted on the television receiver and also from a remote control transmitter (not shown) via a remote control receiver 61. Control panel 59 includes various pushbutton switch keys for controlling various receiver functions such as tuning the receiver "on" and "off", selecting channels and controlling the volume level. However only those with which the present embodiment of the invention are directly concerned are specifically shown. Remote control transmitter 61 includes similar pushbutton switch keys.

In response to the user initiated command signals, microprocessor 53 generates control signals for various portions of the television receiver such as: an on/off control signal for the power supply section (not shown); a channel selection control signal for tuner control unit 5; a video source selection control signal for video source selector switch 13; brightness, contrast, sharpness, color level and tint control signals (not shown) for picture processing unit 15; stereo/SAP and stereo/mono mode selection control signals for stereo/SAP mode selector switch 37 and matrix 41; an audio source selection control signal for audio source selector switch 43; and volume, balance, bass and treble control signals for audio amplifier section 45.

Under the control of microprocessor 53, a character generator 63 generates character representative signals suitable for displaying alphanumeric characters on the screen of picture tube 17. The character representative signals are coupled to picture processing unit 15. Microprocessor 53 controls character generator 63 to display such information as the channel number of the presently selected channel, status information (e.g., whether or not stereo and SAP information is being received), operating instructions, and various "menus" of user control choices (e.g., for adjusting picture properties such as brightness, contrast, sharpness, color level or tint; adjusting audio properties such as volume, balance bass and treble; and selecting between monaural, stereophonic or SAP audio processing modes of operation). The use of menus is desirable since it allows the same user entry keys to be used to select different control choices.

The television receiver so far described is generally similar to currently available RCA brand name television receivers employing CTC-140 chassis described in "RCA Color Television Basic Service Data", 1987 CTC-140 and in the "CTC 140 Color TV Chassis Technical Training Manual" available from Thomson Consumer Electronics, 600 North Sherman Drive, Indianapolis, Ind. However, the present television receiver differs from existing television receivers in that microprocessor 53 is responsive to input signal conditions for dynamically altering the contents of a menu (e.g., the audio menu) by eliminating irrelevant user control choices so that users cannot select the irrelevant control choices using the menu. In prior television receivers, such as those employing CTC-140 chassis, irrelevant control choices were not eliminated from displayed menus in response to signal conditions. This could lead to confusion to users since control choices could be selected utilizing a particular menu but the selection would not produce the expected result. The present dynamic menu feature is particularly desirable considering that signal conditions change from channel to channel.

In the present embodiment the dynamic menu provisions are applied to the audio menu as will now be explained in detail.

Control panel 59 includes "VIDEO" and "AUDIO" pushbutton switch keys for calling up respective menus. In the present embodiment, the control choices are individually and sequentially displayed. Control panel 59 also includes "+" and "−" keys for adjusting a particular control choice.

Repeatedly pressing the VIDEO key causes the following control choices to be sequentially displayed at the bottom of the screen of picture tube 17:
   COLOR
   TINT
   CONTR (for contrast
   BRIGHT (for brightness)
   SHARP (for sharpness) When the control choice is displayed, the corresponding section of picture processing unit 15 enabled for adjustment of the respective picture property. At the same time a control choice is displayed, a horizontally oriented scale is displayed beneath the control choice. Pressing the "−" key causes an indicia to move to the left and causes the corresponding parameter to "decrease". Pressing the "+" key causes the indicia to move to the right and causes the corresponding parameter to "increase". In the case of tint, pressing the "−" key coresponds to a color shift toward one color, e.g., green, and pressing the "+" key causes a color shift toward another color, e.g., red. The decrease or increase is caused by a corresponding adjustment of a control voltage which is coupled to the respective portion of picture processing unit 15 under the control of microprocessor 53.

Repeatedly pressing the AUDIO key causes the following control choices to be sequentially displayed at the bottom of the screen of picture tube 17:
   TREBLE
   BASS
   BAL (for balance)
   STEREO/SAP: MONO or STEREO or SAP (display after ":" depends on the presence of stereo and SAP in the received signal)
   EXPANDED STEREO: ON or OFF (entire display depends on the presence of stereo in the received signal)

A scale is displayed beneath each of the treble, bass and balance control choices and these properties are adjusted by pressing the "−" and "+" keys in a manner similar to that described with respect to the picture properties. In the case of balance, pressing the "−" key causes an increase in the left audio volume level and pressing the "+" key causes an increase in the right audio volume level. Since adjusting the volume levels of both left and right audio channels a the same time is a frequently performed adjustment, special "volume up" and "volume down" keys (not shown) are provided and a "volume" control choice is not part of the audio menu.

The last two control choices (STEREO/SAP and EXPANDED STEREO) are of particular interest since, as is indicated, their inclusion in the audio menu or content is dynamically changed as a function of the presence of stereophonic and SAP information in the received RF television signal, as will be explained below. However, for the present, it will be assumed that the received television signal includes both stereo and SAP information.

When "STEREO/SAP" is displayed, the monophonic, stereophonic or SAP reproduction modes may be selected (again assuming that stereo and SAP information is present in the received RF television signal) by repeatedly pressing either the "−" key or the "+" key. As either one of the "−" or "+" keys is repeatedly pressed, the reproduction mode displayed after the ":" will sequentially change as follows:
   STEREO/SAP : MONO
   STEREO/SAP : STEREO
   STEREO/SAP : SAP The same sequence is produced independent of which are of the "−" or "+" keys is pressed. When a particular reproduction mode is displayed, STEREO/SAP selector switch 37 and matrix 41 are controlled in response to respective control signals from microprocessor 53 to produce the selected response.

When "EXPANDED STEREO" is displayed, the "expanded stereo" mode may be turned on or off (assuming that stereo information is present in the received RF television signal) by repeatedly pressing either the "−" key or "+" key. As one of the "−" or "+" keys is repeatedly pressed, the condition for "expanded stereo" displayed after the ":" will sequentially change as follows:
   EXPANDED STEREO : OFF
   EXPANDED STEREO : ON When "ON" is displayed, microprocessor 53 causes audio amplifier section 45 to combine the left and right audio signals as described above. When "OFF" is displayed, audio amplifier 37 is caused not to combine the left and right audio signals.

When the received RF television signal is not modulated with stereo or SAP information, selection of stereo or expanded stereo or SAP reproduction modes will not produce the expected stereo or SAP responses. In accordance with the principles of the invention, microprocessor 53 is responsive to the absence stereo component in the audio signal produced by sound demodulator 23 to delete the stereo and expanded stereo reproduction mode choices from the audio menu so that they cannot be selected and is responsive to the absence of the SAP component to delete the SAP reproduction mode choice so that it cannot be selected. Thus, the user will not be confused by the selection of a reproduction mode which is rendered ineffective because of input signal conditions.

Specifically, the presence or absence of the stereo component is detected by subcarrier regeneration PLL 31. When stereo is being transmitted, a phase detector within the PLL is responsive to the output signal of the voltage controlled oscillator (not shown) of the PLL and the pilot signal of the composite audio signal produced by sound detector 23 to produce an output signal with a first level indicative of the presence of the stereo component. When stereo is not being transmitted, the pilot signal is not present and the output signal produced by the phase detector has a second level indicative of the absence of the stereo component. The "stereo indicator" output signal produced by the phase detector is coupled to microprocessor 53. In response to the first level indicative of the presence of the stereo component, microprocessor 53 causes the stereo ("STEREO/SAP:STEREO") and expanded stereo ("EXPANDED STEREO") reproduction mode choices to be included in the displayed audio menu as was indicated above so they can be selected. In response to the second level indicative of the absence of the stereo component, microprocessor 53 causes the stereo and expanded stereo reproduction mode choices to be deleted from the displayed audio menu so that they cannot be selected.

The presence or absence of the SAP component is detected by an amplitude detector within FM detector 35 responsive to the modulated SAP component. The output signal of the amplitude detector has a first level when the SAP signal is present and a second level when it is absent. A weak SAP component will be interpreted as corresponding to the absence of the SAP component. The "SAP indicator" output signal of the amplitude detector as coupled to microprocessor 53. In response to the first level indicative of the presence of the SAP component, microprocessor 53 causes the SAP processing choice ("STEREO/SAP:SAP") to be included in the audio menu as indicated above suit can be selected. In response to the second level indicative of the absence of the SAP component, microprocessor 53 causes the SAP reproduction mode choice to be deleted from the displayed audio menu so that it cannot be selected.

As was earlier noted, the television receiver shown in FIG. 1 has a video source selector switch 13 and an audio source selector switch 43 for selecting externally generated baseband video and audio signals from an auxiliary source such as a video cassette recorder or a video disc player. Source selector switches 13 and 43 are controlled by microprocessor 53 in response to user initiated commands generated by pressing keys of control panel 59 or of the remote control transmitter (not shown) associated with remote control receiver 61 (e.g., to enter an "illegal" channel number such as 91 or 92). Source selector switches 13 and 43 operate together so that when an auxiliary source is selected, both external baseband video and audio signals must be provided from the auxiliary source.

When an auxiliary source is selected, the selection of the mono, stereo and SAP reproduction modes will be ineffective since the externally generated left and right baseband audio signals do not pass through and therefore are not processed by MTS decoder 25. To avoid any confusion that may result from selecting the ineffective mono, stereo or SAP reproduction modes under these input signal conditions, microprocessor 53 is responsive to the user initiated command for selecting the auxiliary source to eliminate the mono, stereo and SAP processing mode selection choices ("STEREO/SAP") from the audio menu. However, the expanded stereo ("EXPANDED STEREO") processing mode choice is not eliminated to enable the user to enjoy the enhanced (i.e., "expanded") stereo mono should the externally generated left and right baseband signals be stereophonic.

FIGS. 2 and 2a-2d show a flow chart of the portion of the program stored in PROM 55 for controlling the operation of microprocessor 53 with respect to the audio menu provision described above.

FIG. 2 indicates the organization of the program and includes command decoding and display control subroutines between sections of a main program. The command decoding subroutine decodes user initiated commands generated in response to the operation of keys of control panel 59 and remote control transmitter 61 and causes the storage of data in various memory locations of data RAM 57 to indicate what functions are "set" to be performed in the remainder of the program or in response to additional user initiated commands. The display control subroutine controls the information displayed on the screen of picture tube 17 by generating corresponding character control signals in accordance with the functions "set" in the command decoding subroutine. As will be seen with respect FIGS. 2a-2d, the command decoding subroutine is responsive to signal conditions, e.g, the presence or absence of stereo and SAP components, and other conditions, e.g., whether or not an auxiliary signal source has been selected, to determine which functions are "set" and therefore the nature of the information display and the available user control.

Figure 2A:
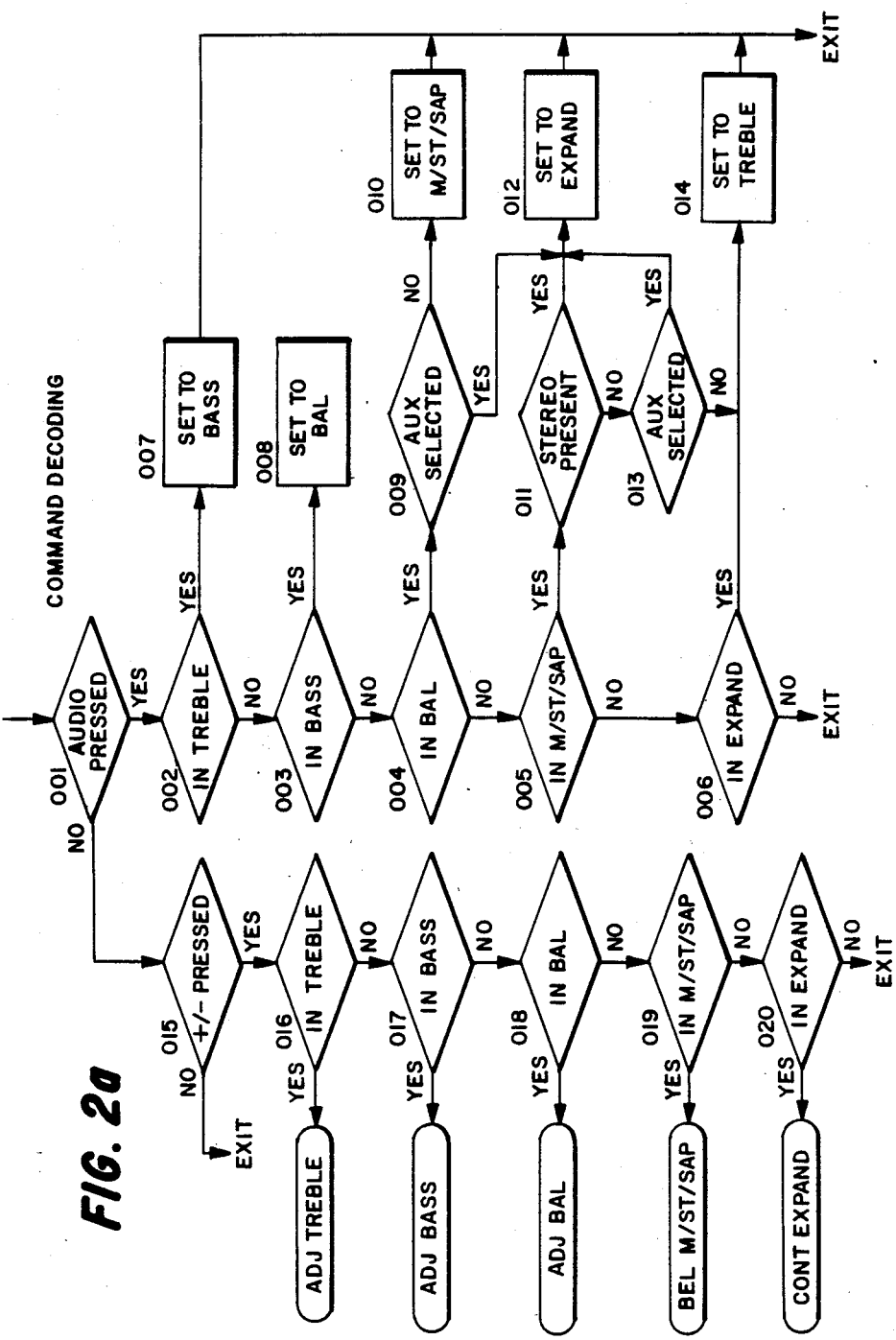

FIG. 2a shows a flow chart of the command decoding subroutine concerned with audio control. Steps 001-014 determine what the new control choice should be after the AUDIO key has been pressed by determining what the last control choice was. It is noted that if an auxiliary source has been selected, the control choice for selecting one of mono, stereo or SAP (M/ST/SAP) cannot be selected (steps 009), and that if stereo information is not present, the control choice for turning the expanded stereo function (EXPAND) on or off cannot be selected unless an auxiliary source has been selected (steps 011 and 013). Steps 015-020 determine which adjustment to make in the case of treble, bass and balance or which processing mode to change in the case of the mono, stereo and SAP (M/ST/SAP) and expanded stereo (EXPAND) control choices after one of the "+" and "−" keys has been pressed. The flow charts of the subroutines for these two control choices are shown in FIGS. 2b and 2c, respectively.

Figure 2B:
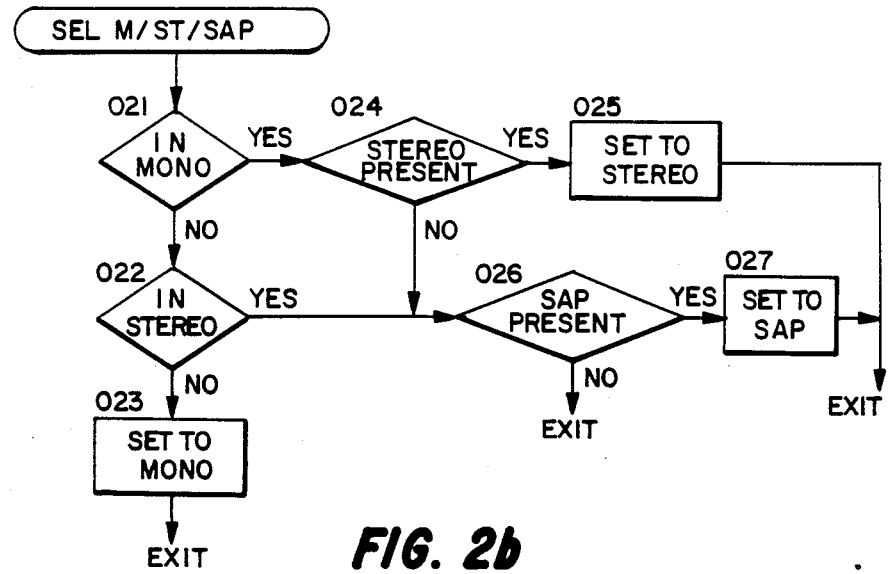

In the flow chart shown in FIG. 2b, steps 021-027 determine which of the mono, stereo or SAP processing modes should be selected after one of the "+" or "−" keys is pressed by determining what the last mode was and by examining whether or not stereo information (step 024) and SAP information (step 026) is present.

Figure 2C:
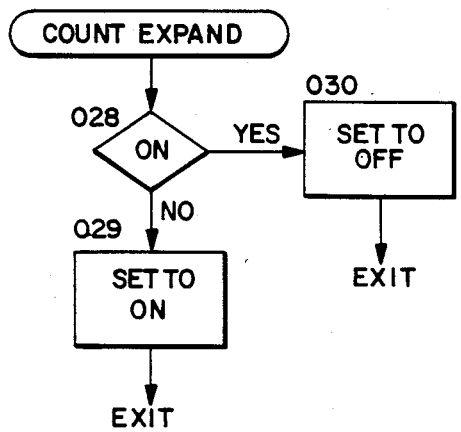

In the flow chart shown in FIG. 2c, steps 028-029 determine the status (i.e, "on" or "off") of the stereo expansion function by determining what the status was previously set to.

Figure 2D:
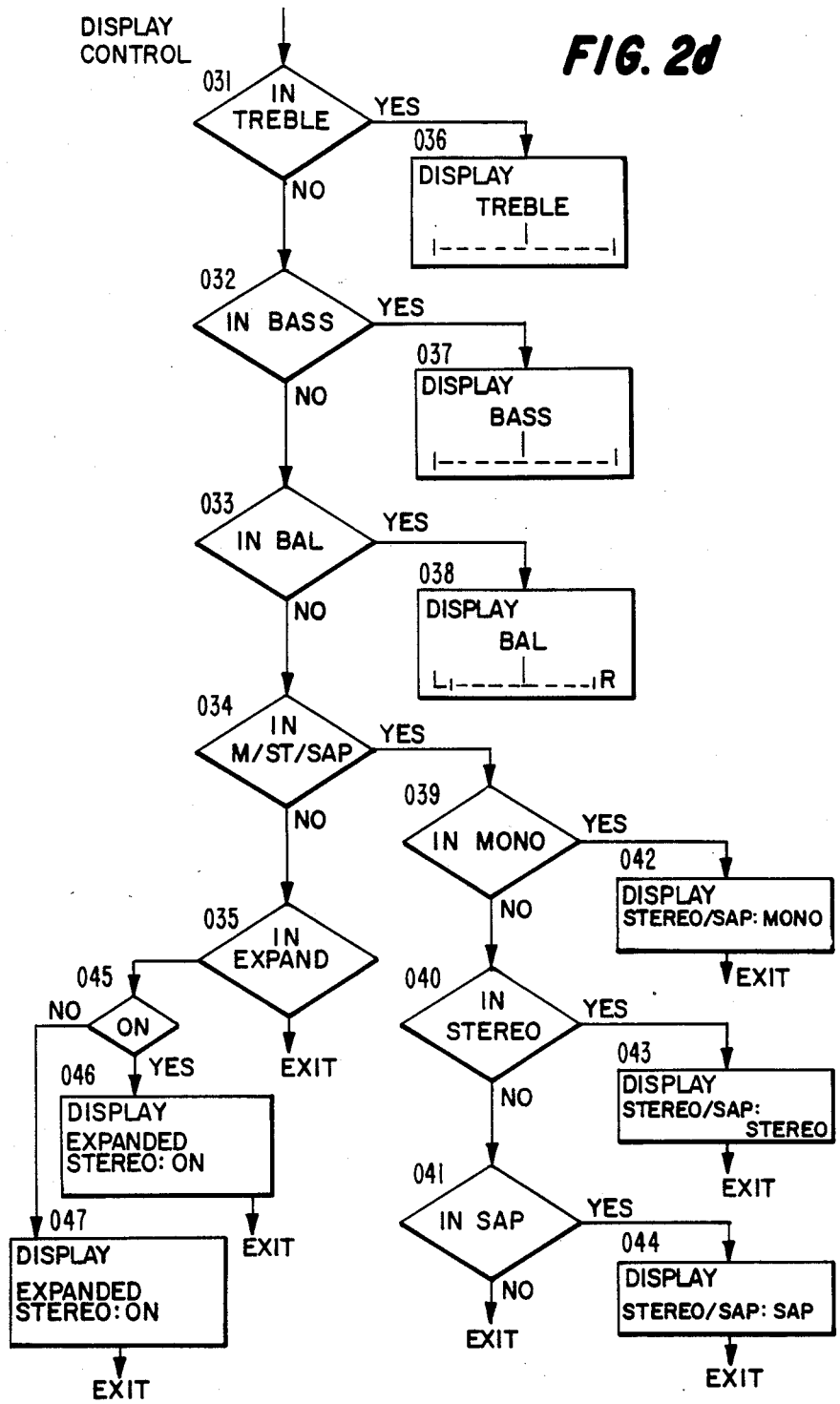

FIG. 2d shows the flow chart of the portion of the display control subroutine concerned with audio control. Steps 031-047 determine what to display in the menu based on what control choice was set in the command decoding subroutine shown in FIGS. 2a-2c. Only the control choice (treble, bass and balance) or processing mode choices (mono, stereo, SAP and expanded stereo) which was previously "set" in the command decoding subroutine will be displayed. Thus, if stereo or SAP information is not in the received RF television signal or an auxiliary source was selected, the corresponding processing mode choices ("STEREO/SAP:STEREO" or "STEREO/SAP:SAP") will not be displayed in the menu. Similarly if stereo information is not present, unless an auxiliary source is selected, the expanded stereo processing mode choices ("EXPANDED STEREO:ON") and ("EXPANDED STEREO:OFF") will not be displayed.

Certain modifications can be made to the described embodiment. The display of a control or processing mode choice can be turned off under automatically program control off if a key is not pressed within a certain time. "Channel up" and "channel down" or "volume up" or "volume down" keys can be used as the "+" and "−" keys. The SAP or stereo presence detectors can include provisions for determining the presence of noise for indicating the "absence" of the receptive signal under severe noise conditions. A preferred processing mode, e.g., such as stereo, can be initially selected upon the application of power to the receiver or when a new channel is selected. In the audio menu, when all of the control choices have been sequentially displayed, the menu can be made to terminate automatically. These and other modifications are contemplated to be within the scope of the following claims.

I claim:

1. In a television system, apparatus comprising:
   tuner means for providing an IF signal having at least one carrier modulated with information corresponding to a respective carrier of a received RF signal of a selected channel;
   processor means responsive to said IF signal and capable of operating in a plurality of processing modes selectable by a user for producing at least one output signal corresponding to said information;
   character generator means for generating a character signal suitable for indicating, in the form of a selection menu displayed by a picture display device, a group of said processing modes selectable by a user;
   user input means for entering command signals for selecting ones of said processing modes via said selection menu;
   signal detector means responsive to said IF signal for generating a characteristic indicative signal indicating whether or not said IF signal has a predetermined signal characteristic; and
   control means coupled to said character generator means for determining which one or more of said plurality of said processing modes are included in said group of processing modes indicated by said selection menu in response to said characteristic indicative signal, thereby dynamically limiting the available processing modes which can be selected by a user in accordance with the content of said IF signal;
   said control means being coupled to said user input means and said processor means for enabling said processor means to operate in the one or more of said processing modes selected via said selection menu.

2. The apparatus defined in claim 1, wherein:
   said IF signal includes a sound carrier component which is modulated with at least monaural audio information and possibly also auxiliary audio information;
   said processor means is capable of operating in a first processing mode to produce a monaural audio output signal corresponding to said monaural audio information, and in a second processing mode to product at least an auxiliary audio output signal corresponding to said auxiliary audio information;
   said characteristic indicative signal indicates whether or not said sound carrier is modulated with said auxiliary audio information; and
   said selection menu indicates said first processing mode and said second processing mode when said sound carrier is modulated with said monaural audio information and also said auxiliary audio information; and said selection menu indicates said first processing mode but not said second processing mode when said sound carrier is modulated with said monaural audio information but not said auxiliary audio information.

3. The apparatus defined in claim 2, wherein:
   said auxiliary audio information is related to the reproduction of a second audio program.

4. The apparatus defined in claim 2, wherein:
   said auxiliary audio information is related to stereophonic audio reproduction of left and right audio output signals.

5. The apparatus defined in claim 1, wherein:
   said IF signal includes a sound carrier modulated to represent at least monaural audio information and possibly also one or both of stereophonic audio information and second audio program information;
   said processor means is capable of operating in a monaural processing mode to produce a monaural output corresponding to said monaural audio information, in a stereophonic processing mode to produce left and right stereophonic output signals corresponding to a combination of said monaural audio information and said stereophonic audio information, and in a SAP processing mode to produce a second audio program output signal corresponding to said second audio program information;
   said signal detector means generates a first characteristic indicative signal indicating whether or not said sound carrier is modulated to represent said stereophonic audio information and a second characteristic indicative signal indicating whether or not said sound carrier is modulated to represent said second audio program information;
   said control means is responsive to said first and second characteristic indicative signals; and
   said selection menu indicates said monaural processing mode, said stereophonic processing mode and said SAP processing mode when said sound carrier is modulated to with said monaural information, said stereophonic and said second audio program information; said selection menu indicates said monaural processing mode and said stereophonic processing mode but not said SAP processing mode when said sound carrier is modulated with said monaural information and said stereophonic information but not with said second audio program information; said selection menu indicates said monaural processing mode but not said stereophonic and SAP processing modes when said sound carrier is modulated with said monaural information but not with said stereophonic and said second audio program information.

6. The apparatus recited in claim 1, wherein:
said character generator means is controlled by said control means to generate said character signal so that processing modes are presented sequentially in time for selection by a user.

7. The apparatus defined in claim 4, wherein:
said processor means includes first and second inputs for receiving left and right baseband auxiliary audio input signals and is capable of processing said left and right baseband auxiliary audio input signals to produce said left and right audio output signals;
said user input means includes auxiliary source selection means for entering a command signal for causing said processor means to select said left and right baseband auxiliary input signals for processing;
said control means is also responsive to the selection of said left and right baseband auxiliary audio input signals for determining which of said processing modes are included in said group of processing modes indicated by said selection menu; said selection menu not indicating said first processing mode and said second processing mode in response to the selection of said left and right baseband auxiliary audio input signals.

8. The apparatus defined in claim 7, wherein:
said processor means is capable of operating in a stereophonic expansion mode for selectively combining said left and right audio output signals;
said selection menu indicating said stereophonic expansion mode when said sound carrier is modulated with said auxiliary audio information or in response to the selection of said left and right baseband auxiliary input audio signals; said selection menu not indicating said stereophonic expansion mode when said sound carrier is not modulated with said auxiliary audio information or said left and right baseband audio input signals have not been selected.

9. The apparatus defined in claim 1, wherein:
said display device comprises a picture tube.

10. In a television system, apparatus comprising:
input means for providing an input signal bearing at least one of audio and video information;
signal processor means responsive to said input signal and capable of operating in a plurality of processing modes for processing said input signal to produce an output signal;
character generator means for generating a character signal suitable for indicating, in the form of a selection menu displayed by a picture display device, a group of said operating modes available for selection by a user;
user input means for allowing a user to enter command signals for selecting ones of said processing modes via said selection menu;
detector means responsive to said input signal for generating at least one characteristic indicative signal indicating the presence or absence of a particular characteristic of said input signal;
control means coupled to said character generator means for determining which one or more of said plurality of operating modes are included in said group of processing modes indicated by said selection menu in response to said characteristic indicative signal, thereby dynamically limiting the available processing modes which can be selected by a user in accordance with the content of said input signal to be processed;
said control means being coupled to said user input means and said processor means for enabling said processor means to operate in the one or more of said processing modes selected by a user via said selection menu.

* * * * *